(12) United States Patent
Zhang

(10) Patent No.: US 12,069,364 B2
(45) Date of Patent: Aug. 20, 2024

(54) ACTION CAMERA, SELFIE CONTROL METHOD AND APPARATUS, MOVABLE PLATFORM, AND STORAGE MEDIUM

(71) Applicant: SZ DJI TECHNOLOGY CO., LTD., Shenzhen (CN)

(72) Inventor: Ge Zhang, Shenzhen (CN)

(73) Assignee: SZ DJI Technology CO., Ltd., Shenzhen (CN)

( * ) Notice: Subject to any disclaimer, the term of this patent is extended or adjusted under 35 U.S.C. 154(b) by 115 days.

(21) Appl. No.: 17/566,693

(22) Filed: Dec. 31, 2021

(65) Prior Publication Data

US 2022/0124255 A1    Apr. 21, 2022

Related U.S. Application Data

(63) Continuation of application No. PCT/CN2019/101551, filed on Aug. 20, 2019.

(51) Int. Cl.
   *H04N 23/63*    (2023.01)
   *H04N 23/53*    (2023.01)
   *H04N 23/62*    (2023.01)

(52) U.S. Cl.
   CPC .......... *H04N 23/632* (2023.01); *H04N 23/53* (2023.01); *H04N 23/62* (2023.01)

(58) Field of Classification Search
   CPC ...... H04N 23/632; H04N 23/53; H04N 23/62; H04N 23/50
   See application file for complete search history.

(56) References Cited

U.S. PATENT DOCUMENTS

| | | | | |
|---|---|---|---|---|
| 10,645,292 | B2* | 5/2020 | Park | G06F 1/1637 |
| 2010/0208122 | A1* | 8/2010 | Yumiki | G02B 7/023 |
| | | | | 348/E5.022 |
| 2011/0157017 | A1* | 6/2011 | Webb | G06F 3/0317 |
| | | | | 345/158 |

(Continued)

FOREIGN PATENT DOCUMENTS

| | | |
|---|---|---|
| CN | 105141852 A | 12/2015 |
| CN | 105791927 A | 7/2016 |

(Continued)

OTHER PUBLICATIONS

International Search Report of PCT/CN2019/101551 (Feb. 25, 2021).

*Primary Examiner* — Timothy J Henn

(57) ABSTRACT

The present disclosure provides an action camera, a selfie control method and apparatus, a movable platform, and a storage medium. The action camera includes: a camera body; a lens assembly, disposed on one side of the camera body; a first display apparatus, disposed on the same side as the lens assembly of the camera body, where the first display apparatus is configured to display an image obtained by the lens assembly; and a second display apparatus, disposed on another side of the camera body and opposite to the first display apparatus, where the second display apparatus is configured to obtain a touch operation, and generate a control command based on the touch operation to control, according to the control command, displaying performed by the first display apparatus. The action camera controls a front screen through "back-touch" by using a "rear screen".

20 Claims, 8 Drawing Sheets

First display apparatus

Second display apparatus

(56) References Cited

U.S. PATENT DOCUMENTS

| | | | | |
|---|---|---|---|---|
| 2014/0192244 | A1* | 7/2014 | Ishihara | H04N 23/633 |
| | | | | 348/333.02 |
| 2015/0022627 | A1* | 1/2015 | Sato | H04N 23/698 |
| | | | | 348/36 |
| 2015/0189162 | A1 | 7/2015 | Kuo et al. | |
| 2016/0004376 | A1* | 1/2016 | Mitsunaga | G06F 3/0488 |
| | | | | 345/173 |
| 2016/0227016 | A1* | 8/2016 | Kim | G02B 3/0043 |
| 2019/0230293 | A1 | 7/2019 | Jung et al. | |
| 2020/0050416 | A1* | 2/2020 | Myung | H04N 23/632 |
| 2021/0112196 | A1* | 4/2021 | Iyer | H04N 23/611 |

FOREIGN PATENT DOCUMENTS

| | | |
|---|---|---|
| CN | 106453962 A | 2/2017 |
| CN | 106502414 A | 3/2017 |
| CN | 106657460 A | 5/2017 |
| CN | 108549521 A | 9/2018 |
| CN | 108769506 A | 11/2018 |
| CN | 109085990 A | 12/2018 |
| CN | 109120760 A | 1/2019 |
| CN | 109361794 A | 2/2019 |
| CN | 109640020 A | 4/2019 |

* cited by examiner

ACTION CAMERA, SELFIE CONTROL METHOD AND APPARATUS, MOVABLE PLATFORM, AND STORAGE MEDIUM

RELATED APPLICATIONS

This application is a continuation application of PCT application No. PCT/CN2019/101551, filed on Aug. 20, 2019, and the content of which is incorporated herein by reference in its entirety.

TECHNICAL FIELD

The present disclosure relates to the technical field of action cameras, and specifically, to an action camera, a selfie control method, a movable platform, a camera control system, an action camera with a selfie function, and a computer-readable storage medium.

BACKGROUND

Most conventional action cameras may have only one screen. For a few high-end models with dual screens, although the rear screen may be a large multi-functional screen, and may also support touch operations in some models, the front screen may only be used to display basic parameters such as battery level and storage space, and may neither be used to find a view for a selfie operation, nor support touch operations. Therefore, frequently switches between the front screen and the rear screen to adjust a photographing parameter and preview a selfie result may be required, and may result in poor user experience.

Therefore, there is an urgent need for a method to improve selfie experience of the action camera with dual screens.

BRIEF SUMMARY

The present disclosure is intended to resolve at least one of existing technical problems in the existing technologies.

Some exemplary embodiments of the present disclosure provide an action camera, including: a camera body; a lens assembly, disposed on a first side of the camera body; a first display apparatus, disposed on the first side of the camera body, where the first display apparatus is configured to display an image obtained by the lens assembly; and a second display apparatus, disposed on a second side of the camera body and opposite to the first display apparatus, where the second display apparatus is configured to receive a touch operation, and generate a control command based on the touch operation to control, based on the control command, display of the first display apparatus.

Some exemplary embodiments of the present disclosure provide a selfie control method, applied to an action camera, where the action camera includes: a camera body; a lens assembly disposed on a first side of the camera body; a first display apparatus disposed on the first side of the camera body; and a second display apparatus disposed on a second side of the camera body and opposite to the first display apparatus; where the method includes: receiving a touch operation performed by a user on the second display apparatus; generating a control command based on the touch operation, where the control command is used to control display of the first display apparatus; and controlling, based on the control command, display of the first display apparatus, to adjust a selfie result.

Some exemplary embodiments of the present disclosure provide a movable platform, including: a handheld unit; and a gimbal, disposed on the handheld unit, including an action camera, where the action camera includes: a camera body; a lens assembly, disposed on a first side of the camera body; a first display apparatus, disposed on the first side of the camera body; where the first display apparatus is configured to display an image obtained by the lens assembly; and a second display apparatus, disposed on a second side of the camera body and opposite to the first display apparatus, where the second display apparatus is configured to receive a touch operation, and generate a control command based on the touch operation to control, based on the control command, display of the first display apparatus and the lens assembly.

BRIEF DESCRIPTION OF THE DRAWINGS

The foregoing and/or additional aspects and advantages of the present disclosure will become apparent and readily understandable from the description of the exemplary embodiments with reference to the following accompanying drawings.

In FIG. 1 and FIG. 2, correspondences between reference numerals and part names are as follows:

2: action camera; 20: camera body; 22: lens assembly; 24: first display apparatus; 26: second display apparatus.

DETAILED DESCRIPTION

To clearly understand the above objectives, features and advantages of the present disclosure, the present disclosure is further described in detail below with reference to the accompanying drawings and some exemplary embodiments. It should be noted that, if there is no conflict, the following exemplary embodiments and features in the exemplary embodiments may be mutually combined.

Many specific details are set forth in the following description to facilitate a full understanding of the present disclosure. However, the present disclosure can also be implemented in other ways different from those described herein. Therefore, the protection scope of the present disclosure is not limited by the specific embodiments disclosed below.

In some exemplary embodiments of the present disclosure, a photographing apparatus is provided, which may include a lens assembly, a touchscreen and a parameter display screen. The touchscreen and the parameter display screen may be located on different sides of a body of the photographing apparatus. Both the parameter display screen and the touchscreen may be configured to display a current photographing parameter, a system setting parameter, and a system menu, and may further be configured to display image information obtained by the lens assembly in real time, and information about image and video that have been shot. The touchscreen may be configured to receive a touch operation. An action camera, a selfie control method, a movable platform, a camera control system, an action camera with a selfie function, and a computer-readable storage medium according to some exemplary embodiments of the present disclosure are described below with reference to FIG. 1 to FIG. 15.

Figure 1:
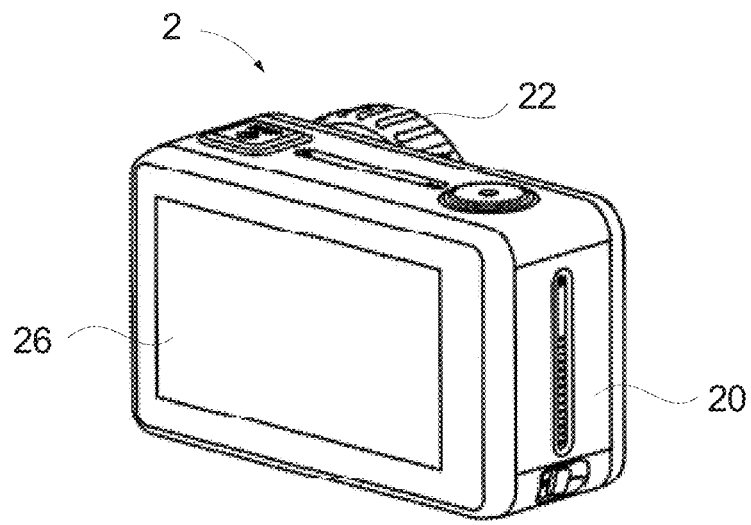
FIG. 1 is a rear perspective view of a schematic structure of an action camera according to some exemplary embodiments of the present disclosure.
Figure 2:
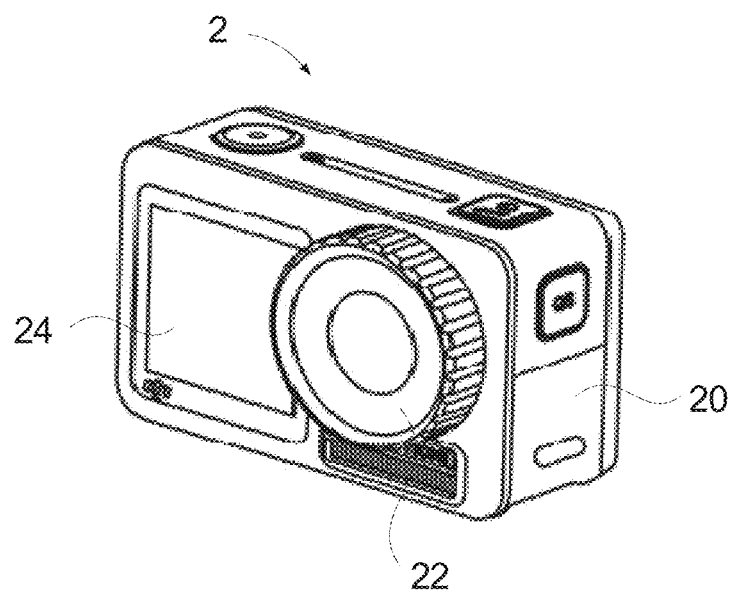
FIG. 2 is a front perspective view of a schematic structure of an action camera according to some exemplary embodiments of the present disclosure.

As shown in FIG. 1 and FIG. 2, in some exemplary embodiments of the present disclosure, an action camera 2 is provided. The action camera may include: a camera body 20; a lens assembly 22, disposed on one side of the camera body 20; a first display apparatus 24, disposed on the same side as the lens assembly 22 of the camera body 20, where the first display apparatus 24 may be configured to display an image obtained by the lens assembly 22; and a second display apparatus 26, disposed on another side of the camera body 20 and opposite to the first display apparatus 24, where the second display apparatus 26 may be configured to obtain a touch operation, and may generate a control command based on the touch operation to control, according to the control command, display of the first display apparatus 24.

In some exemplary embodiments, both the first display apparatus 24 (commonly known as a front screen) and the lens assembly 22 may be located on one side of the camera body 20 of the action camera 2, and the second display apparatus 26 (commonly known as a rear screen) may be located on another side of the camera body 20. The first display apparatus 24 and the second display apparatus 26 may be opposite to each other. The second display apparatus 26 may include a touch function, and may be configured to receive a touch operation of a user, and may generate a control command based on the received touch operation and may control the display of the first display apparatus 24 based on the control command, so as to enable the action camera 2 to have a function of "back-touch" by using the "rear screen". In this way, when the action camera 2 is used for a selfie operation, there is no need to flip the camera front and back frequently to adjust photographing setting and preview on the "rear screen", and there is no need to include a flipping structure for the "rear screen" for taking a selfie, or set an additional touch layer on the front screen to assist the selfie operation. It is simple and easy to operate, and easy for the user to learn. In addition, user experience of the action camera 2 for the selfie operation may be significantly improved, without increasing costs of the action camera 2.

As shown in FIG. 1 and FIG. 2, in some exemplary embodiments of the present disclosure, the second display apparatus 26 may be a touch display screen, and the touch display screen may be configured to obtain the touch operation, and generate the control command for the first display apparatus 24 and/or the lens assembly 22 based on the touch operation.

In some exemplary embodiments, the second display apparatus 26 (rear screen) may be set as the touch display screen, and the touch display screen may include a liquid crystal display (LCD) and a touch receiving layer encapsulated with the LCD. The second display apparatus 26 may be configured to obtain the touch operation from the user, such as tapping, sliding, or two-finger pinching, and may generate the control command for the first display apparatus 24 and the lens assembly 22 based on a type of the touch operation, to control content displayed on the first display apparatus 24, and/or send a specific command for focusing, metering, photographing, or the like to the lens assembly 22.

In some exemplary embodiments of the present disclosure, the controlling, according to the control instruction, of the display of the first display apparatus 24 may include: setting a display parameter of the first display apparatus 24 according to the control command to control the first display apparatus 24 to display based on the display parameter; and/or controlling, according to the control command, the first display apparatus 24 to play back the image or a video.

In some exemplary embodiments, after the second display apparatus 26 generates the corresponding control command according to a touch command of the user, the display parameter of the first display apparatus 24 may be set according to the control command. For example, the display parameter such as brightness or color saturation of the first display apparatus 24 may be adjusted, the first display apparatus 24 may be controlled to display a "setting page", a "photographing parameter page", a "photographing preview page", and the like, or the first display apparatus 24 may be controlled to display an image or video that has been taken by the action camera 2 or stored in the camera body 20, to play back the image or the video by using the first display apparatus 24.

In some exemplary embodiments of the present disclosure, the display parameter may include at least one of: brightness, contrast, or saturation.

In some exemplary embodiments, through delivering the touch command to the second display apparatus 26 in a preset touch mode, a display result of the first display apparatus 24, including but not limited to the display brightness and the display contrast of the first display apparatus 24, and the color saturation of the displayed image, may be precisely controlled.

As shown in FIG. 1 and FIG. 2, in some exemplary embodiments of the present disclosure, display area of the second display apparatus 26 may be greater than that of the first display apparatus 24.

In some exemplary embodiments, the second display apparatus 26 (rear screen) may be a large screen. In some exemplary embodiments, the rear screen may be a large borderless screen or a "bezel-less screen". The first display apparatus 24 and the lens assembly 22 may be located on the same side of the camera body 20. Therefore, it is not suitable to set the first display apparatus 24 as a large screen such as "bezel-less screen". In this case, the display area of the second display apparatus 26 may be larger than that of the first display apparatus 24. This may facilitate appearance design and industrial design of the action camera 2, and may make the action camera 2 more aesthetically appealing and less costly. In addition, this may effectively increase touch area of "back-touch", so that the user may input a touch gesture on the second display apparatus 26 more easily. Further, the user may input a composite touch control command by inputting a "gesture pattern" or the like, to further improve user experience and user interaction efficiency.

In some exemplary embodiments of the present disclosure, both the first display apparatus 24 and the second display apparatus 26 may be color display apparatuses.

In some exemplary embodiments, both the first display apparatus 24 and the second display apparatus 26 may have "color screens", in other words, may display colored images. In this way, when the action camera 2 is used to take a selfie, precision of view finding for the selfie operation may be effectively improved, a "color", a "tone" and other information of a finished image may be previewed in real time, and a color preview may be obtained in real time during photographing, so that the preview page may be more in line with an actual photo or video, so as to improve selfie taking experience.

In some exemplary embodiments of the present disclosure, both the first display apparatus 24 and the second display apparatus 26 may be configured to display image information obtained by the lens assembly 22.

In some exemplary embodiments, both the first display apparatus 24 (front screen) and the second display apparatus 26 (rear screen) may be configured to display the image information obtained by the lens assembly 22. In other words, both the "front screen" and the "rear screen" may have a "view finding" function. In some exemplary embodiments, the situation where the first display apparatus 24 (front screen) displays the image information obtained by the lens assembly 22 may be more suitable for taking selfies, and the situation where the second display apparatus 26 (rear screen) displays the image information obtained by the lens assembly 22 may be more suitable for a conventional photographing scene.

In some exemplary embodiments of the present disclosure, the second display apparatus 26 may be configured to: obtain different types of touch operations, and generate corresponding control commands based on the different types of touch operations to control, according to the control commands, the first display apparatus 24 to display correspondingly.

In some exemplary embodiments, the second display apparatus 26 may obtain the different types of touch operations, such as left-sliding, right-sliding, tapping, double-tapping, and multi-finger sliding, and may generate the corresponding control commands based on the different types of touch operations, so that the user may control, based on different touch gestures, different functions performed by the action camera 2, further improving the user experience of the action camera 2 when taking a selfie.

In some exemplary embodiments, if the touch operation obtained by the second display apparatus 26 reaches an operation threshold, for example, if the second display apparatus 26 receives a left-sliding operation, and when the user reaches a limit value when adjusting a currently-adjusted parameter, the second display apparatus may send corresponding prompt information to the user, to prompt the user that the currently adjusted parameter has reached the limit value. The prompt may be a vibration, voice alert, screen flashing, LED flashing, or the like. Prompt forms are not limited herein. In this way, an intuitive operation feedback may be provided to the user, so that the user may easily adjust the touch operation, thereby improving the user experience. In some exemplary embodiments, when the touch operation obtained by the second display apparatus 26 is a two-point touch operation of the display apparatus, for example, a multi-finger sliding operation. If the multi-finger sliding operation does not accord with a preset touch operation standard, the second display apparatus may send corresponding prompt information to the user to prompt the user that the touch operation does not accord with the preset touch operation standard. The prompt may be a vibration, voice alert, screen flashing, LED flashing, or the like. Prompt forms are not limited herein. In this way, an intuitive operation feedback may be provided to the user, so that the user may easily adjust the touch operation, thereby improving the user experience.

In some exemplary embodiments of the present disclosure, the different types of touch operations may be customized, so that after obtaining the touch operations, the second display apparatus 26 may generate the corresponding control commands based on the touch operations according to the control commands, to control the first display apparatus 24 to display correspondingly.

In some exemplary embodiments, the user may customize the different types of touch operations, and a control command corresponding to each type of touch operation. For example, the user may customize that a "double-tapping" operation corresponds to a command for switching content displayed by the first display apparatus 24 and the second display apparatus 26. For another example, the user may customize that a "single-finger down-sliding" operation corresponds to a command for controlling the first display apparatus 24 to display a control center.

In some exemplary embodiments of the present disclosure, the action camera may further include: a control apparatus. The control apparatus may be connected to the lens assembly 22, the first display apparatus 24, and the second display apparatus 26. The control apparatus may be configured to: when the first display apparatus 24 displays the image information obtained by the lens assembly 22, control, according to the control command received by the second display apparatus 26, the lens assembly 22 to adjust an image acquisition parameter, and control the first display apparatus 24 to display the image acquisition parameter.

In some exemplary embodiments, the action camera 2 may include the control apparatus. When the action camera 2 is used to take a selfie, in other words, when the first display apparatus 24 displays the image information obtained by the lens assembly 22, the control apparatus may control, according to the control command received by the second display apparatus 26, the lens assembly 22 to adjust the image acquisition parameter in a mode set by the user, for example, change a metering point, adjust a focus point, or control white balance, and controls the first display apparatus 24 to display the corresponding image acquisition parameter in real time, to provide specific adjusted content to the user.

Figure 3:
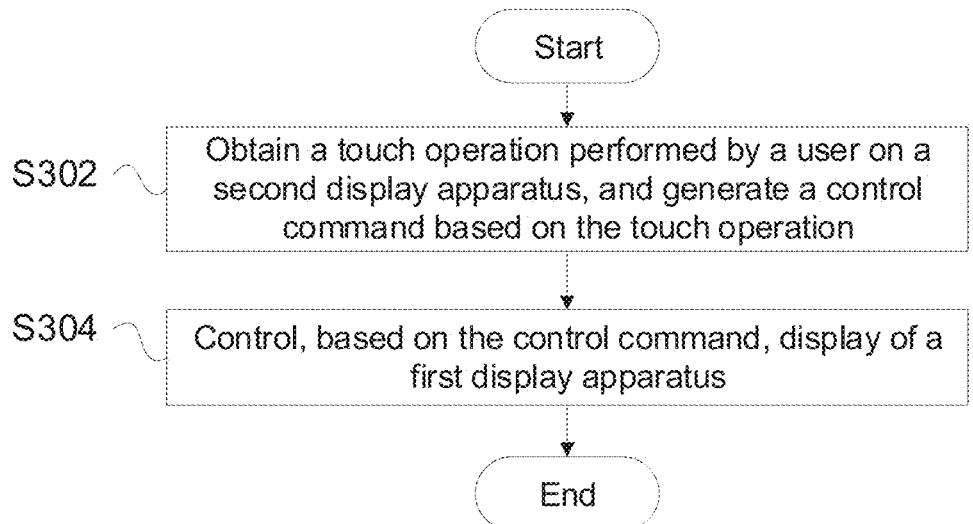
FIG. 3 is a flowchart of a selfie control method according to some exemplary embodiments of the present disclosure.

As shown in FIG. 3, in some exemplary embodiments of the present disclosure, a selfie control method is provided, which may be applied to an action camera, where the action camera may include: a camera body, a lens assembly disposed on one side of the camera body, a first display apparatus disposed on the same side as the lens assembly of the camera body, and a second display apparatus disposed on another side of the camera body and opposite to the first display apparatus; and the method may include the following steps:

S302, obtain a touch operation performed by a user on the second display apparatus, and generate a control command based on the touch operation;

S304, control, based on the control command, display of the first display apparatus.

In some exemplary embodiments, display of the "front screen (first display apparatus)" of the action camera may be controlled by obtaining the "back-touch" operation performed by the user on the "rear screen (second display apparatus)" of the action camera, so that the user may adjust a selfie result through the "back-touch" operation during a selfie operation. In this way, when an action camera without a flipping screen or its front screen does not have a touch function is used, there is no need to frequently flip the action camera front and back to adjust a selfie parameter by using the "rear screen". It is simple and easy to operate, and easy for the user to learn. This may improve user interaction experience in the selfie scene, and may greatly improve selfie experience of the action camera without the flipping screen or its front screen does not have the touch function.

Figure 4:
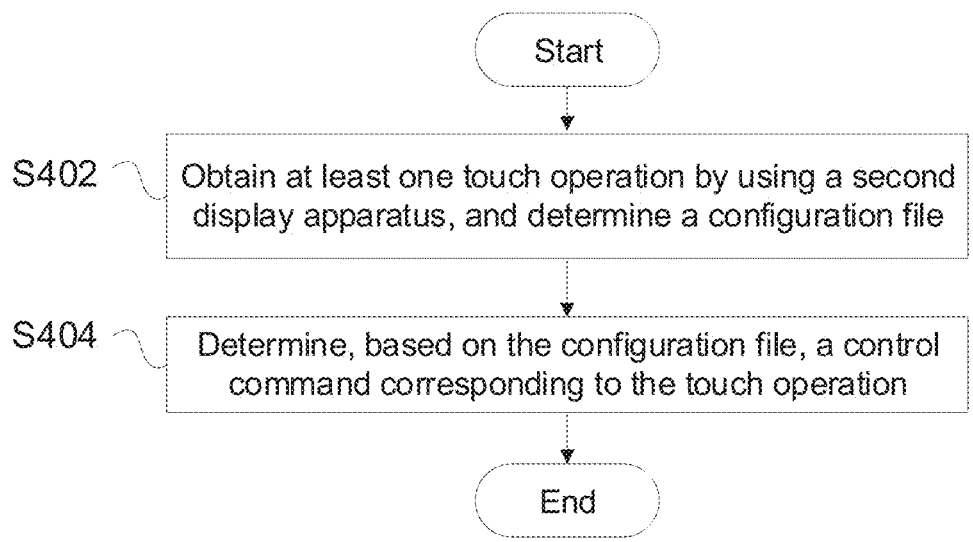
FIG. 4 is a flowchart of a selfie control method according to some exemplary embodiments of the present disclosure.

As shown in FIG. 4, in some exemplary embodiments of the present disclosure, the step of obtaining a touch operation performed by a user on the second display apparatus, and generating a control command based on the touch operation may further include the following steps:

S402, obtain at least one touch operation by using the second display apparatus, and determine a configuration file;

S404, determine, based on the configuration file, a control command corresponding to the touch operation.

In some exemplary embodiments, the preset configuration file may be determined, while the at least one touch operation may be obtained by using the second display apparatus. The configuration file may be preset when the action camera leaves the factory, or may be customized by the user. The control command corresponding to the touch operation may be searched and determined based on the configuration file, and the action camera may be controlled according to the corresponding control command to perform photographing.

In some exemplary embodiments of the present disclosure, the selfie control method may further include: receiving the configuration file sent by a control terminal.

In some exemplary embodiments, the action camera may interact with at least one control terminal. The user may generate a latest configuration file by using the control terminal, customize different types of touch commands and corresponding control commands in the configuration file, and may send the configuration file to the action camera. The action camera may receive the configuration file from the control terminal and may save it. In this way, the user may efficiently customize the control command and the configuration file by using the terminal in communication with the action camera, thereby improving interaction efficiency of controlling the action camera.

In some exemplary embodiments of the present disclosure, the selfie control method may further include: receiving a configuration command sent by a control terminal, and generating the configuration file according to the configuration command.

In some exemplary embodiments, the action camera may interact with at least one control terminal, and the user may send the configuration command through a data connection between the control terminal and the action camera. The configuration command may include defining at least one type of touch operation and a control command corresponding to the touch operation. After receiving the configuration command sent by the control terminal, the action camera may generate the corresponding configuration file locally according to the configuration command, and may save the corresponding configuration file.

In some exemplary embodiments of the present disclosure, the selfie control method may further include: determining a configuration command based on the touch operation, and generating the configuration file according to the configuration command.

In some exemplary embodiments, the user may directly perform the touch operation on the action camera to generate the configuration file. Specifically, the user may input at least one type of touch operation on the second display apparatus, and may manually specify a control command corresponding to the touch operation, so that a mapping between the touch operation and the control command may be locally generated on the action camera, and the configuration file may be further generated.

In some exemplary embodiments of the present disclosure, the selfie control method may further include: determining a modification command for the configuration file based on the touch operation, and modifying the configuration file according to the modification command.

In some exemplary embodiments, the user may access the configuration file stored in the action camera at any time, the user may also input the touch operation by using the second display apparatus, so as to modify the existing configuration file in real time to customize the configuration file in real time. In this way, the user may customize a selfie control mode based on an operation habit of the user, thereby making it easy to learn for the user and improving user experience.

In some exemplary embodiments of the present disclosure, the step of obtaining a touch operation performed by a user on the second display apparatus, and generating a control command based on the touch operation to control displaying performed by the first display apparatus may include: obtaining different types of touch operations, and generating corresponding control commands based on the different types of touch operations to control, according to the control commands, the first display apparatus to display correspondingly.

In some exemplary embodiments, the action camera may obtain, by using the second display apparatus, the different types of touch operations input by the user. After obtaining at least one touch operation, the action camera may first identify a type of the touch operation, determine a control command corresponding to the touch operation in the configuration file, and then may control, according to the control command, the first display apparatus to display correspondingly, thereby achieving free control of the action camera. In this way, the operation is simple, easy for the user to learn, and the user may easily control the display of the first display apparatus.

In some exemplary embodiments of the present disclosure, the different types of touch operations may be customized, so that after obtaining the touch operations, the second display apparatus may generate the corresponding control commands based on the touch operations to control, according to the control commands, the first display apparatus to display correspondingly.

In some exemplary embodiments, the user may freely define the different types of touch operations and a control command corresponding to each type of touch operation. In this way, when the action camera is used to take a selfie, different types of touch operation may be input as required, to control the first display apparatus to display different content, thereby enriching the control means when taking the selfie. In this way, the user may control the action camera more precisely during the selfie operation, thereby improving the user interaction experience while taking the selfie.

In some exemplary embodiments of the present disclosure, the step of determining, based on the configuration file and the obtained different types of touch operations, a control command corresponding to the touch operation may include: determining, based on the configuration file, at least one operation instance corresponding to the touch operation, and finding a corresponding control command of the operation instance in a preset control command library, to generate the control command.

In some exemplary embodiments, when obtaining the different types of touch operations, the second display apparatus may read the configuration file stored in the action camera, and may find an operation instance corresponding to each type of touch operation in the configuration file; and may find, based on different operation instances, a control command corresponding to each operation instance in the preset control command library, and may generate the control command to control the action camera to execute the corresponding operation instance. The operation instance may include operations for calling different functions of the action camera, such as controlling the lens assembly to focus, controlling the first display apparatus to change display brightness, controlling a control apparatus of the action camera to adjust a format (RAW format or JPEG format) of a stored image.

In some exemplary embodiments of the present disclosure, the different types of touch operations may include at least one of: single-finger up-sliding, single-finger down-sliding, single-finger left-sliding, single-finger right-sliding, double-finger up-sliding, double-finger down-sliding, double-finger left-sliding, double-finger right-sliding, touch-and-hold, single-finger tapping, single-finger double-tapping, double-finger tapping, or double-finger double-tapping.

It may be understood that the touch operation is not limited to the example touch operations mentioned above. The user may freely define different types of touch operations based on an actual need or a preference.

In some exemplary embodiments of the present disclosure, the control command library may include at least one of: controlling the first display apparatus to display a control center, controlling the first display apparatus to display a photographing parameter that may be set for the lens assembly, controlling the lens assembly to perform metering, controlling the lens assembly to focus, controlling the lens assembly to obtain an image based on the photographing parameter, controlling the lens assembly to take a video based on the photographing parameter, controlling the first display apparatus to display the image and/or video collected by the lens assembly, adjusting the brightness of the first display apparatus, or exchanging content displayed by the first display apparatus and the second display apparatus.

It may be understood that control commands included in the control command library are not limited to the example control commands mentioned above. There may be more control commands in the control command library as more functions are added to the action camera. In addition, the existing control command library may be expanded in real time through firmware upgrade.

In some exemplary embodiments of the present disclosure, as shown in FIG. 5 to FIG. 12, a plurality of touch operations and a control command corresponding to each type of touch operation may be preset.

Figure 5:
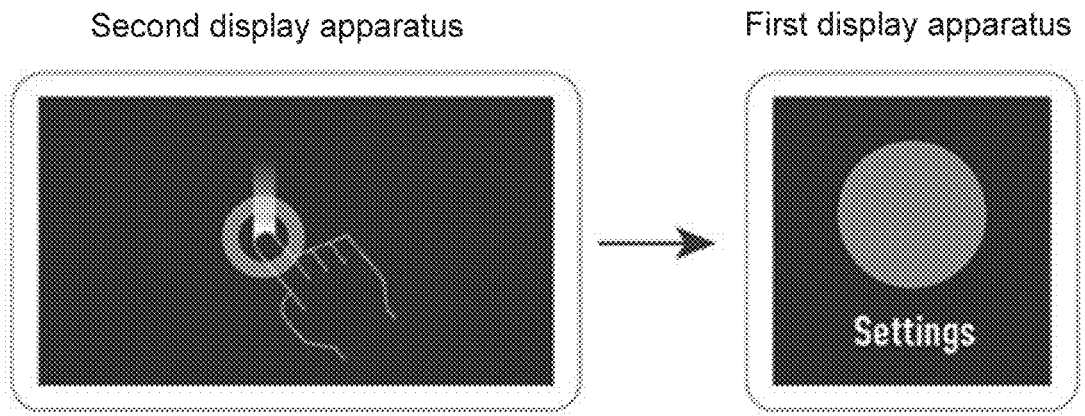
FIG. 5 is a schematic diagram of a correspondence between a touch operation and a control command according to some exemplary embodiments of the present disclosure.

In some exemplary embodiments, as shown in FIG. 5, the touch operation may be single-finger down-sliding, and a corresponding control command may be controlling the first display apparatus to display the control center. Specifically, the user may slide down with one finger on the second display apparatus, and then the first display apparatus may display the control center.

The control center may select a switch function that may turn a switch on/off simply by tapping the screen. Each screen may only have one function. A function may be switched by sliding left or right, such as voice control, full front screen, brightness adjustment, screen flipping, or the like. A desired function may also be customized by using the rear screen.

Figure 6:
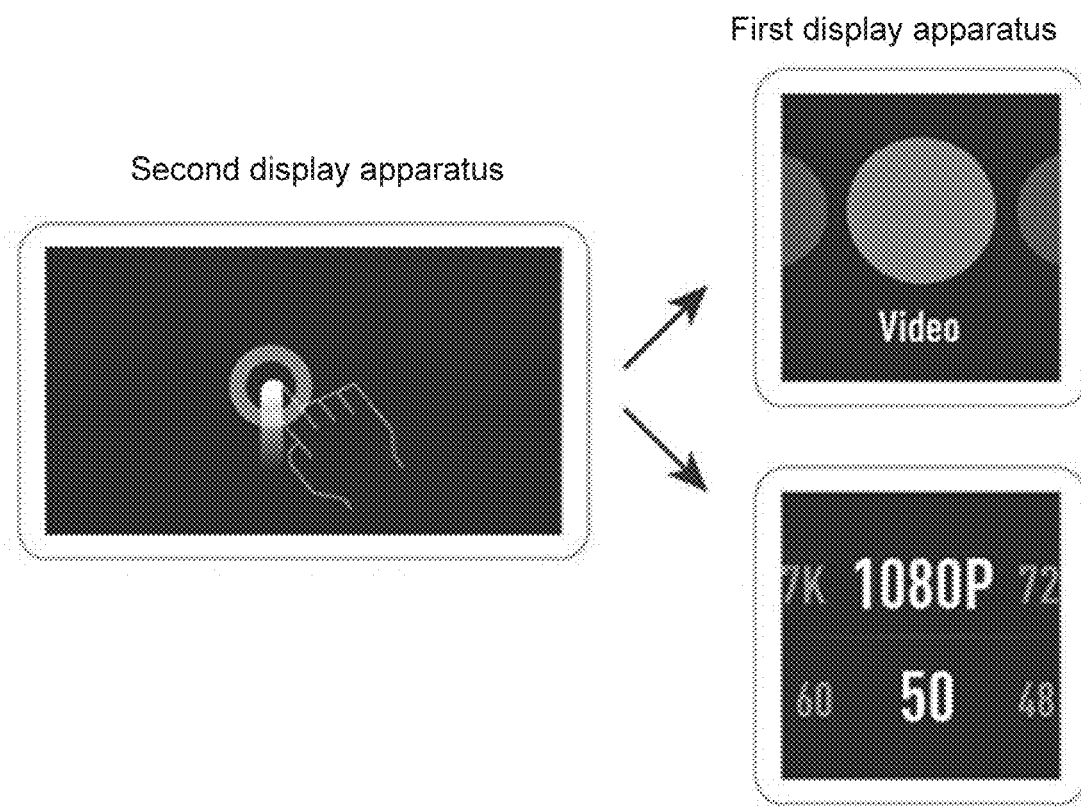
FIG. 6 is a schematic diagram of a correspondence between a touch operation and a control command according to some exemplary embodiments of the present disclosure.

In some exemplary embodiments, as shown in FIG. 6, the touch operation may be single-finger up-sliding, and a corresponding control command may be controlling the first display apparatus to display photographing mode switching before photographing, or dynamically adjusting the photographing parameter during photographing. Specifically, the user may slide up with one finger on the second display apparatus before photographing, and then the first display apparatus may display different photographing modes such as photographing, video recording, and overcranking (where the frame rate at which a video is being shot is higher than normal, so that when played back at a normal speed the action is in slow motion. During photographing, the user may slide up with one finger on the second display apparatus, and then the first display apparatus may display different photographing parameters such as a photographing resolution and a frame rate for video recording.

In the case of photographing mode switching, the user may switch between photographing/video recording/slow-motion modes, customize a desired mode by using the rear screen, or share a mode set for fast switching.

In the case of displaying the different photographing parameters, the user may set simple parameter in a current mode, for example, set a resolution and a frame rate for recording, and a resolution and a speed multiple for slow motion.

Figure 7:
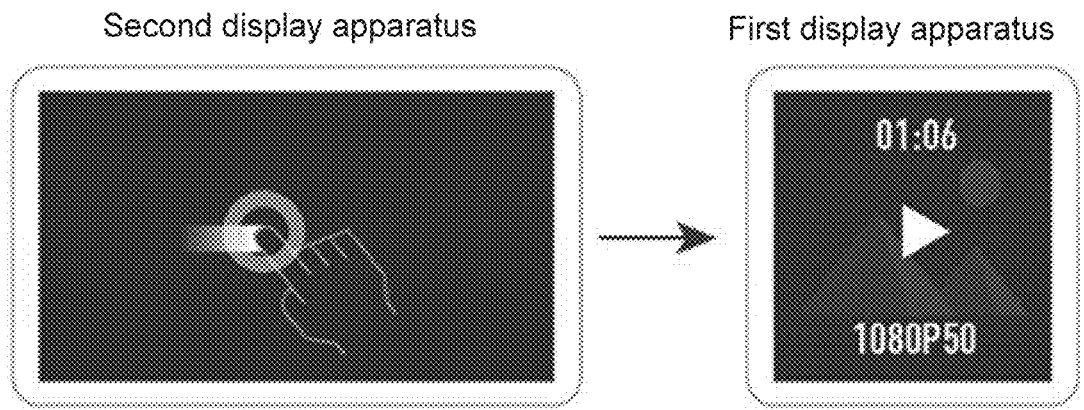
FIG. 7 is a schematic diagram of a correspondence between a touch operation and a control command according to some exemplary embodiments of the present disclosure.

In some exemplary embodiments, as shown in FIG. 7, the touch operation may be single-finger right-sliding, and a corresponding control command may be controlling the first display apparatus to display media playback. Specifically, the user may slide right with one finger on the second display apparatus, and then the first display apparatus may display an image or a video that has been taken, and may display specific parameters of the image or video (such as a resolution and frame rate of the video).

After photographing, by sliding right on the rear screen, the user may preview a just-photographed picture to determine whether a composition of the picture, a parameter of the picture, or the like need to be adjusted in real time, and may play back the video. During video playback, the brightness or sound may be adjusted by sliding up or down on left and right sides, and a media file may be marked or deleted.

Figure 8:
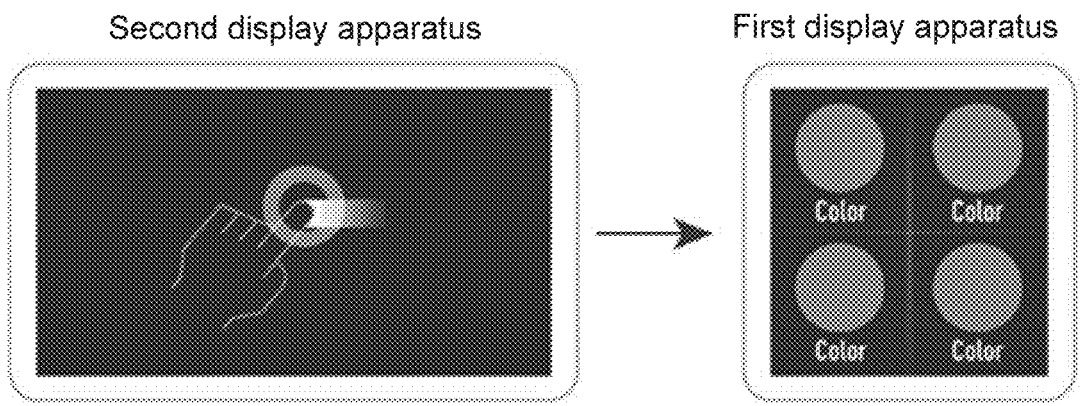
FIG. 8 is a schematic diagram of a correspondence between a touch operation and a control command according to some exemplary embodiments of the present disclosure.

In some exemplary embodiments, as shown in FIG. 8, the touch operation may be single-finger left-sliding, and a corresponding control command may be controlling the first display apparatus to display an image setting page. Specifically, the user may slide left with one finger on the second display apparatus, and then the first display apparatus may display different image filters, and presents display statuses, under the different image filters, of a current image obtained by the lens assembly.

Simple functions that may be switched on and off by tapping may be set, such as color adjustment, distortion correction, and format change. A form of four squares or a form of one screen with only one function may be used. That is, the screen may be divided into four equivalent sections where each section corresponds to one function thereby including four functions at one time, or the screen may only include one function at one time, and the user may slide left or right and tap to switch and select the function, or may customize a desired function by using the rear screen.

Figure 9:
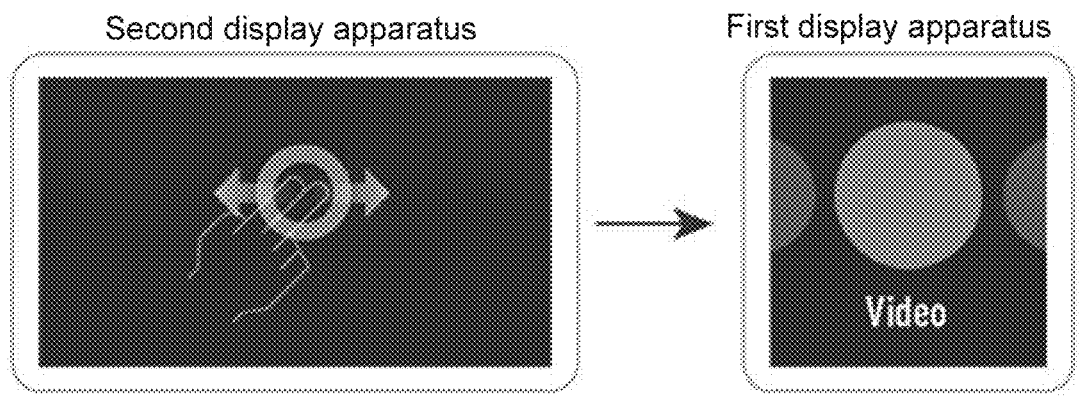
FIG. 9 is a schematic diagram of a correspondence between a touch operation and a control command according to some exemplary embodiments of the present disclosure.

In some exemplary embodiments, as shown in FIG. 9, the touch operation may be double-finger left-sliding or right-sliding, and a corresponding control command may be switching the photographing mode. Specifically, the action camera may include a mode queue including the following photographing modes in sequence: "photo", "video", and "slow motion video". For example, a current photographing mode may be "video". When the user slides left with two fingers on the second display apparatus, the current photographing mode may be switched from "video" to "photo". When the user slides right with two fingers on the second display apparatus again, the current photographing mode may be switched from "video" to "slow motion video".

Figure 10:
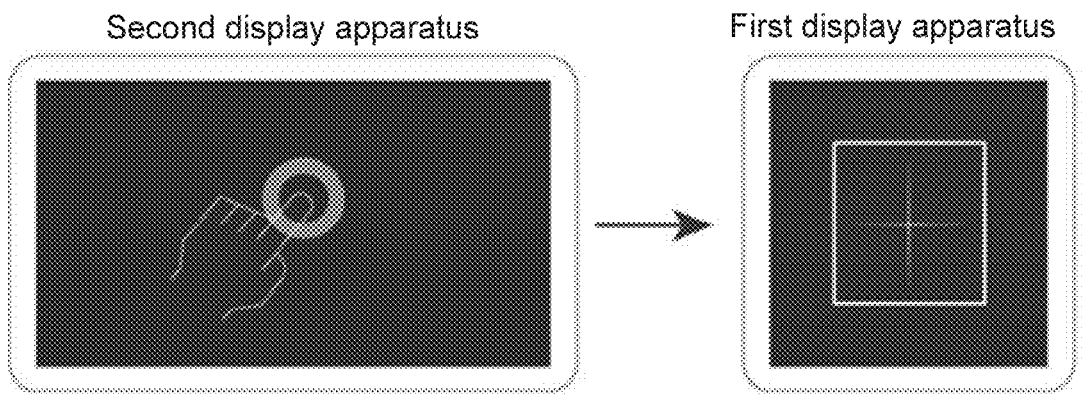
FIG. 10 is a schematic diagram of a correspondence between a touch operation and a control command according to some exemplary embodiments of the present disclosure.

In some exemplary embodiments, as shown in FIG. 10, the touch operation may be touch-and-hold, and a corresponding control command may be controlling the lens assembly to perform metering. Specifically, when the first display apparatus displays the image obtained by the lens assembly, the user may perform a touch-and-hold operation on the second display apparatus, and then the lens assembly may be controlled to perform a metering operation.

Figure 11:
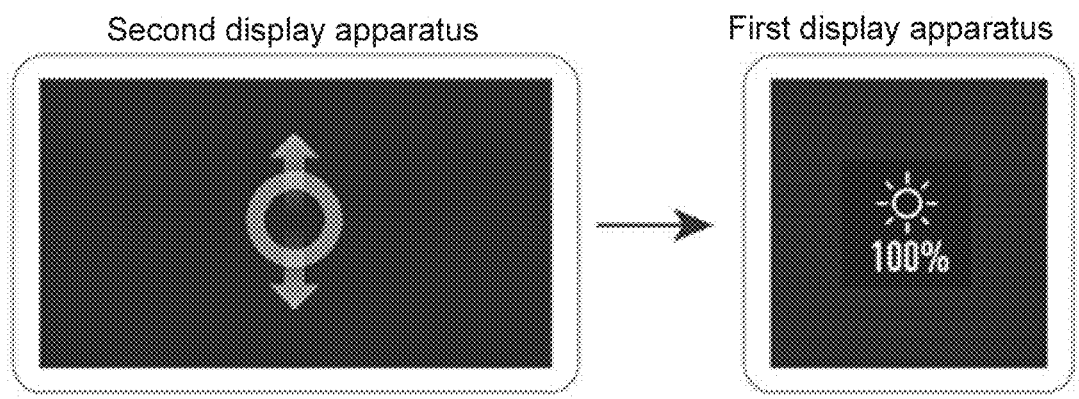
FIG. 11 is a schematic diagram of a correspondence between a touch operation and a control command according to some exemplary embodiments of the present disclosure.

In some exemplary embodiments, as shown in FIG. 11, the touch operation may be single-finger up-sliding or down-sliding, and a corresponding control command may be dynamically adjusting screen brightness during photographing. Specifically, during photographing, the user may slide up with one finger on the second display apparatus, and then the screen brightness of the first display apparatus may be increased; the user may slide down with one finger on the second display apparatus, and then the screen brightness of the first display apparatus may be reduced.

Figure 12:
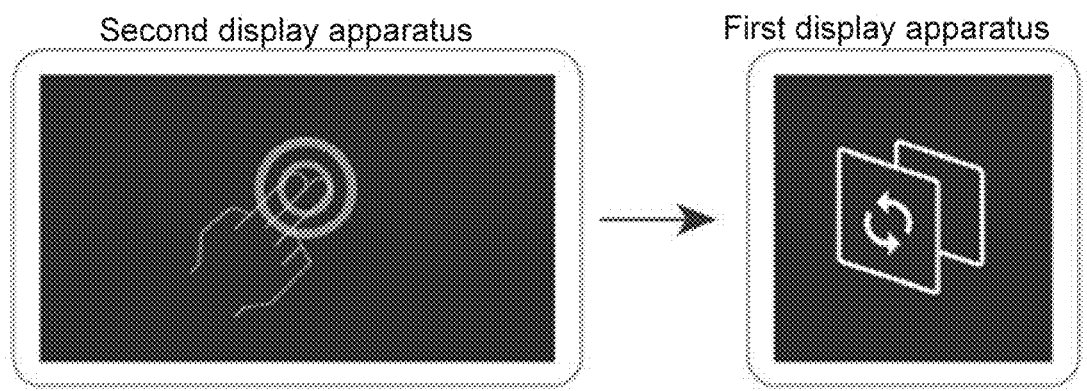
FIG. 12 is a schematic diagram of a correspondence between a touch operation and a control command according to some exemplary embodiments of the present disclosure.

In some exemplary embodiments, as shown in FIG. 12, the touch operation may be double-finger double-tapping, and a corresponding control command may be switching the content displayed by the first display apparatus and the second display apparatus. Specifically, the user may double tap with two fingers on the second display apparatus, and then the first display apparatus and the second display apparatus may be controlled to exchange the displayed content, in other words, the contents of the front and rear screens are switched.

Figure 13:
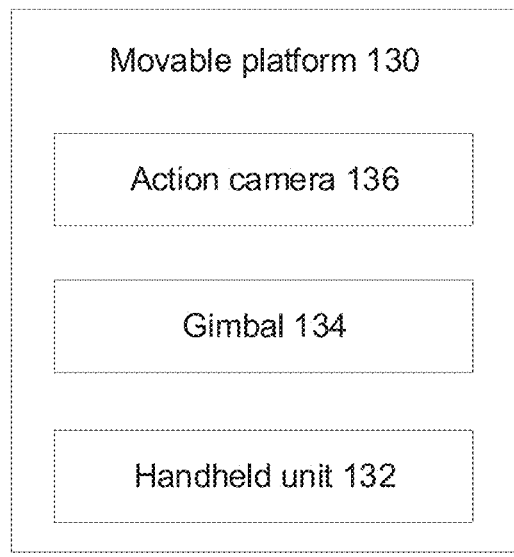
FIG. 13 is a schematic diagram of a movable platform according to some exemplary embodiments of the present disclosure.

As shown in FIG. 13, some exemplary embodiments of the present disclosure provide a movable platform 130, which may include a handheld unit 132 and a gimbal 134. The gimbal 134 may be disposed on the handheld unit 132, and the gimbal 134 may include an action camera 136. The action camera 136 may include: a camera body; a lens assembly, disposed on one side of the camera body; a first display apparatus, disposed on the same side as the lens assembly of the camera body, where the first display apparatus may be configured to display an image obtained by the lens assembly; and a second display apparatus, disposed on another side of the camera body and opposite to the first display apparatus, where the second display apparatus may be configured to obtain a touch operation, and may generate a control command based on the touch operation to control, according to the control command, display of the first display apparatus and the lens assembly.

In some exemplary embodiments, the movable platform may include the handheld unit, the gimbal disposed on the handheld unit, and the action camera disposed on the gimbal. When the movable platform is used by a user, the user may hold the handheld unit, and the gimbal may automatically respond based on shaking of the user's hand, to keep the action camera on the gimbal relatively stable, to ensure that an image/video taken by the action camera is not "shaky" or "out of focus" due to the shaking of the user's hand.

In some exemplary embodiments, both the first display apparatus (commonly known as a front screen) and the lens assembly may be located on one side of the camera body of the action camera, and the second display apparatus (commonly known as a rear screen) may be located on another side of the camera body. The first display apparatus and the second display apparatus may be opposite to each other. The second display apparatus may include a touch function, and may be configured to receive a touch operation of the user, and may generate a control command based on the received touch operation and may control the display of the first display apparatus, so as to enable the action camera to have a function of "back-touch" by using the "rear screen". In this way, when the action camera is used for a selfie operation, there is no need to flip the camera front and back frequently to adjust photographing setting and preview on the "rear screen", and there is no need to include a flipping structure of the "rear screen" for taking a selfie, or set an additional touch layer on the front screen to assist the selfie operation. It is simple and easy to operate, and easy for the user to learn. In addition, user experience of the action camera for the selfie operation may be significantly improved, without increasing costs of the action camera.

In some exemplary embodiments of the present disclosure, the second display apparatus may be a touch display screen, and the touch display screen may be configured to receive the touch operation, and may generate the control command for the first display apparatus and/or the lens assembly based on the touch operation.

In some exemplary embodiments, the second display apparatus (rear screen) may be set as the touch display screen, and the touch display screen may include an LCD and a touch receiving layer encapsulated with the LCD. The second display apparatus may be configured to obtain the touch operation from the user, such as tapping, sliding, or two-finger pinching, and may generate the control command for the first display apparatus and the lens assembly based on a type of the touch operation, to control content displayed by the first display apparatus, and/or send a specific command for focusing, metering, photographing, or the like to the lens assembly.

In some exemplary embodiments of the present disclosure, the controlling, according to the control command, of the display of the first display apparatus may include: setting a display parameter of the first display apparatus according to the control command to control the first display apparatus to display based on the display parameter; and/or controlling, according to the control command, the first display apparatus to play back the image or a video.

In some exemplary embodiments, after the second display apparatus generates the corresponding control command according to a touch command of the user, the display parameter of the first display apparatus may be set according to the control command. For example, the display parameter such as brightness or color saturation of the first display apparatus may be adjusted, the first display apparatus may be controlled to display a "setting page", a "photographing parameter page", a "photographing preview page", and the like, or the first display apparatus may be controlled to display an image or video that has been taken by the action camera or stored in the camera body, to play back the image or the video by using the first display apparatus.

In some exemplary embodiments of the present disclosure, the display parameter may include at least one of: brightness, contrast, or saturation.

In some exemplary embodiments, through delivering the touch command to the second display apparatus in a preset touch mode, a display result of the first display apparatus, including but not limited to the display brightness and the display contrast of the first display apparatus, and the color saturation of the displayed image, may be precisely controlled.

In some exemplary embodiments of the present disclosure, display area of the second display apparatus may be greater than that of the first display apparatus.

In some exemplary embodiments, the second display apparatus (rear screen) may be a large screen. In some exemplary embodiments, the rear screen may be a large borderless screen or a "bezel-less screen". The first display apparatus and the lens assembly may be located on the same side of the camera body. Therefore, it is not suitable to set the first display apparatus as a large screen such as "bezel-less screen". In this case, the display area of the second display apparatus may be larger than that of the first display apparatus. This may facilitate appearance design and industrial design of the action camera, and may make the action camera more aesthetically appealing and less costly. In addition, this may effectively increase touch area of "back-touch", so that the user may input a touch gesture on the second display apparatus more easily. Further, the user may input a composite touch control command by inputting a "gesture pattern" or the like, to further improve user experience and user interaction efficiency.

In some exemplary embodiments of the present disclosure, both the first display apparatus and the second display apparatus may be color display apparatuses.

In some exemplary embodiments, both the first display apparatus and the second display apparatus may have "color screens", in other words, may display colored images. In this way, when the movable platform is used to take a selfie, precision of view finding for the selfie operation may be effectively improved, a "color", a "tone" and other information of a finished image may be previewed in real time, and a color preview may be obtained in real time during photographing, so that the preview page is more in line with an actual photo or video, so as to improve selfie taking experience.

In some exemplary embodiments of the present disclosure, both the first display apparatus and the second display apparatus may be configured to display image information obtained by the lens assembly.

In some exemplary embodiments, both the first display apparatus (front screen) and the second display apparatus (rear screen) may be configured to display the image information collected by the lens assembly. In other words, both the "front screen" and the "rear screen" may have a "view finding" function. In some exemplary embodiments, the situation where the first display apparatus (front screen) displays the image information obtained by the lens assembly may be more suitable for taking selfies, and the situation where the second display apparatus (rear screen) displays the image information collected by the lens assembly may be more suitable for a conventional photographing scene.

In some exemplary embodiments of the present disclosure, the second display apparatus may be configured to: obtain different types of touch operations, and generate corresponding control commands based on the different types of touch operations to control, according to the control commands, the first display apparatus to display correspondingly.

In some exemplary embodiments, the second display apparatus may obtain the different types of touch operations, such as left-sliding, right-sliding, tapping, double-tapping, and multi-finger sliding, and may generate the corresponding control commands based on the different types of touch operations, so that the user may control, based on different touch gestures, different functions performed by the action camera, further improving the user experience of the action camera when taking a selfie.

In some exemplary embodiments, if the touch operation obtained by the second display apparatus reaches an operation threshold, for example, if the second display apparatus receives a left-sliding operation, and when the user reaches a limit value when adjusting a currently-adjusted parameter, the second display apparatus may send corresponding prompt information to the user, to prompt the user that the currently adjusted parameter has reached the limit value. The prompt may be a vibration, voice alert, screen flashing, LED flashing, or the like. Prompt forms are not limited herein. In this way, an intuitive operation feedback may be provided to the user, so that the user may easily adjust the touch operation, thereby improving the user experience. In some exemplary embodiments, when the touch operation obtained by the second display apparatus is a two-point touch operation of the display apparatus, for example, a multi-finger sliding operation. If the multi-finger sliding operation does not accord with a preset touch operation standard, the second display apparatus may send corresponding prompt information to the user to prompt the user that the touch operation does not accord with the preset touch operation standard. The prompt may be a vibration, voice alert, screen flashing, LED flashing, or the like. Prompt forms are not limited herein. In this way, an intuitive operation feedback may be provided to the user, so that the user may easily adjust the touch operation, thereby improving the user experience. In some exemplary embodiments of the present disclosure, the different types of touch operations may be customized, so that after obtaining the touch operations, the second display apparatus may generate the corresponding control commands based on the touch operations to control, according to the control commands, the first display apparatus to display correspondingly.

In some exemplary embodiments, the user may customize the different types of touch operations, and a control command corresponding to each type of touch operation. For example, the user may customize that a "double-tapping" operation corresponds to a command for switching content displayed by the first display apparatus and the second display apparatus. For another example, the user may customize that a "single-finger down-sliding" operation corresponds to a command for controlling the first display apparatus to display a control center.

In some exemplary embodiments of the present disclosure, the action camera may further include: a control apparatus. The control apparatus may be connected to the lens assembly, the first display apparatus, and the second display apparatus. The control apparatus may be configured to: when the first display apparatus displays the image information obtained by the lens assembly, control, according to the control command received by the second display apparatus, the lens assembly to adjust an image acquisition parameter, and control the first display apparatus to display the image acquisition parameter.

In some exemplary embodiments, the action camera may include the control apparatus. When the action camera is used to take a selfie, in other words, when the first display apparatus displays the image information obtained by the lens assembly, the control apparatus may control, according to the control command received by the second display apparatus, the lens assembly to adjust the image acquisition parameter in a mode set by the user, for example, change a metering point, adjust a focus point, or control white balance, and controls the first display apparatus to display the corresponding image acquisition parameter in real time, to provide specific adjusted content to the user.

Figure 14:
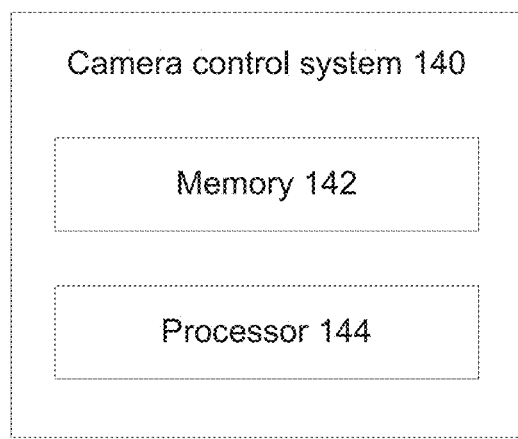
FIG. 14 is a schematic diagram of a camera control system according to some exemplary embodiments of the present disclosure.

As shown in FIG. 14, in some exemplary embodiments of the present disclosure, a camera control system 140, applied to an action camera, is provided. The action camera may include a camera body; a lens assembly disposed on one side of the camera body; a first display apparatus disposed on the same side as the lens assembly of the camera body; and a second display apparatus disposed on another side of the camera body and opposite to the first display apparatus. The camera control system may include a memory 142 storing a computer program; and a processor 144, where the processor 144 may be configured to execute the computer program to perform the following steps: obtaining a touch operation performed by a user on the second display apparatus, and generating, based on the touch operation, a control command for controlling displaying performed by the first display apparatus; and controlling, according to the control command, display of the first display apparatus to adjust a selfie result.

In some exemplary embodiments, display of the "front screen (first display apparatus)" of the action camera may be controlled by obtaining the "back-touch" operation performed by the user on the "rear screen (second display apparatus)" of the action camera, so that the user may adjust a selfie result through the back-touch operation during a selfie operation. In this way, when an action camera without a flipping screen or its front screen does not have a touch function is used, there is no need to frequently flip the action camera front and back to control a selfie parameter by using the "rear screen". It is simple and easy to operate, and easy for the user to learn. This may improve user interaction experience in the selfie scene, and may greatly improve selfie experience of the action camera without the flipping screen or its front screen does not have the touch function.

In some exemplary embodiments of the present disclosure, the processor may be configured to: obtain at least one touch operation by using the second display apparatus, and determine a configuration file; and determining, based on the configuration file, a control command corresponding to the touch operation.

In some exemplary embodiments, the preset configuration file may be determined, while the at least one touch operation may be obtained by using the second display apparatus. The configuration file may be preset when the action camera leaves the factory, or may be customized by the user. The control command corresponding to the touch operation may be searched and determined based on the configuration file, and the action camera may be controlled according to the corresponding control command to perform photographing.

Figure 15:
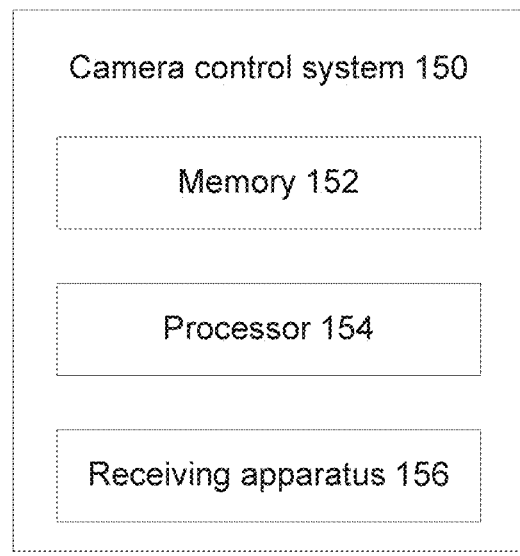
FIG. 15 is a schematic diagram of a camera control system according to some exemplary embodiments of the present disclosure.

In some exemplary embodiments of the present disclosure, as shown in FIG. 15, a camera control system 150 may include: a storage 152, a processor 154, and a receiving apparatus 156. The receiving apparatus 156 may be configured to receive the configuration file sent by a control terminal.

In some exemplary embodiments, the action camera may interact with at least one control terminal. The user may generate a latest configuration file by using the control terminal, customize different types of touch commands and corresponding control commands in the configuration file, and may send the configuration file to the action camera. The action camera may receive the configuration file from the control terminal and may save it. In this way, the user may efficiently customize the control command and the configuration file by using the terminal in communication with the action camera, thereby improving interaction efficiency of controlling the action camera.

In some exemplary embodiments of the present disclosure, as shown in FIG. 15, the camera control system 150 may further include a receiving apparatus 156, configured to receive a configuration command sent by a control terminal and generate the configuration file according to the configuration command.

In some exemplary embodiments, the action camera may interact with at least one control terminal, and the user may send the configuration command through a data connection between the control terminal and the action camera. The configuration command may include defining at least one type of touch operation and a control command corresponding to the touch operation. After receiving the configuration command sent by the control terminal, the action camera may generate the corresponding configuration file locally according to the configuration command, and may save the corresponding configuration file.

In some exemplary embodiments of the present disclosure, the processor may be configured to: determine a configuration command based on the touch operation, and generate the configuration file according to the configuration command.

In some exemplary embodiments, the user may directly perform the touch operation on the action camera to generate the configuration file. Specifically, the user may input at least one type of touch operation on the second display apparatus, and may manually specify a control command corresponding to the touch operation, so that a mapping between the touch operation and the control command may be locally generated on the action camera, and the configuration file may be further generated.

In some exemplary embodiments of the present disclosure, the processor may be further configured to: determine a modification command for the configuration file based on the touch operation, and modify the configuration file according to the modification command.

In some exemplary embodiments, the user may access the configuration file stored in the action camera at any time, the user may also input the touch operation by using the second display apparatus, so as to modify the existing configuration file in real time to customize the configuration file in real time. In this way, the user may customize a selfie control mode based on an operation habit of the user, thereby making it easier for the user to learn and improving user experience.

In some exemplary embodiments of the present disclosure, the processor may be configured to: obtain different types of touch operations, and generate corresponding control commands based on the different types of touch operations to control, according to the control commands, the first display apparatus to display correspondingly.

In some exemplary embodiment, the action camera may obtain, by using the second display apparatus, the different types of touch operations input by the user. After obtaining at least one touch operation, the action camera may first identify a type of the touch operation, determine a control command corresponding to the touch operation in the configuration file, and then may control, according to the control command, the first display apparatus to display correspondingly, thereby achieving free control of the action camera. In this way, the operation is simple, easy for the user to learn, and the user may easily control the display of the first display apparatus.

In some exemplary embodiments of the present disclosure, the different types of touch operations may be customized, so that after obtaining the touch operations, the second display apparatus may generate the corresponding control commands based on the touch operations to control, according to the control commands, the first display apparatus to display correspondingly.

In some exemplary embodiments, the user may freely define the different types of touch operations and a control command corresponding to each type of touch operation. In this way, when the action camera is used to take a selfie, different types of touch operation may be input as required, to control the first display apparatus to display different content, thereby enriching the control means when taking the selfie. In this way, the user may control the action camera more precisely during the selfie operation, thereby improving the user experience while taking the selfie.

In some exemplary embodiments of the present disclosure, the processor may be further configured to: determine, based on the configuration file, at least one operation instance corresponding to the touch operation, and find a corresponding control command of the operation instance in a preset control command library, to generate the control command.

In some exemplary embodiments, when obtaining the different types of touch operations, the second display apparatus may read the configuration file stored in the action camera, and may find an operation instance corresponding to each type of touch operation in the configuration file; and may find, based on different operation instances, a control command corresponding to each operation instance in the preset control command library, and may generate the control command to control the action camera to execute the corresponding operation instance. The operation instance may include operations for calling different functions of the action camera, such as controlling the lens assembly to focus, controlling the first display apparatus to change display brightness, controlling a control apparatus of the action camera to adjust a format (RAW format or JPEG format) of a stored image.

In some exemplary embodiments of the present disclosure, the different types of touch operations include at least one of: single-finger up-sliding, single-finger down-sliding, single-finger left-sliding, single-finger right-sliding, double-finger up-sliding, double-finger down-sliding, double-finger left-sliding, double-finger right-sliding, touch-and-hold, single-finger tapping, single-finger double-tapping, double-finger tapping, or double-finger double-tapping.

It may be understood that the touch operation is not limited to the example touch operations mentioned above. The user may freely define different types of touch operations based on an actual need or a preference.

In some exemplary embodiments of the present disclosure, the control command library may include at least one of: controlling the first display apparatus to display a control center, controlling the first display apparatus to display a photographing parameter that may be set for the lens assembly, controlling the lens assembly to perform metering, controlling the lens assembly to focus, controlling the lens assembly to obtain an image based on the photographing parameter, controlling the lens assembly to take a video based on the photographing parameter, controlling the first display apparatus to display the image and/or video collected by the lens assembly, adjusting the brightness of the first display apparatus, or exchanging content displayed by the first display apparatus and the second display apparatus.

It may be understood that control commands included in the control command library are not limited to the example control commands mentioned above. There may be more control commands in the control command library as more functions are added to the action camera. In addition, the existing control command library may be expanded in real time through firmware upgrade.

In some exemplary embodiments of the present disclosure, as shown in FIG. 5 to FIG. 12, a plurality of touch operations and a control command corresponding to each type of touch operation may be preset.

In some exemplary embodiments, as shown in FIG. 5, the touch operation may be single-finger down-sliding, and a corresponding control command may be controlling the first display apparatus to display the control center. Specifically, the user may slide down with one finger on the second display apparatus, and then the first display apparatus may display the control center.

The control center may select a switch function that may turn a switch on/off by simply tapping the screen. Each screen may only have one function. A function may be switched by sliding left or right, such as voice control, full front screen, brightness adjustment, screen flipping, or the like. A desired function may also be customized by using the rear screen.

In some exemplary embodiments, as shown in FIG. 6, the touch operation may be single-finger up-sliding, and a corresponding control command may be controlling the first display apparatus to display photographing mode switching before photographing, or dynamically adjusting the photographing parameter during photographing. Specifically, the user may slide up with one finger on the second display apparatus before photographing, and then the first display apparatus may display different photographing modes such as photographing, video recording, and slow motion video. During photographing, the user may slide up with one finger on the second display apparatus, and then the first display apparatus may display different photographing parameters such as a photographing resolution and a frame rate for video recording.

In the case of photographing mode switching, the user may switch between photographing/video recording/slow-motion modes, customize a desired mode by using the rear screen, or share a mode set for fast switching.

In the case of displaying the different photographing parameters, the user may set simple parameter in a current mode, for example, set a resolution and a frame rate for recording, and a resolution and a speed multiple for slow motion.

In some exemplary embodiments, as shown in FIG. 7, the touch operation may be single-finger right-sliding, and a corresponding control command may be controlling the first display apparatus to display media playback. Specifically, the user may slide right with one finger on the second display apparatus, and then the first display apparatus may display an image or a video that has been taken, and may display specific parameters of the image or video (such as a resolution and frame rate of the video).

After photographing, by sliding right on the rear screen, the user may preview a just-photographed picture to determine whether a composition of the picture, a parameter of the picture, and the like need to be adjusted in real time, and may play back the video. During video playback, the brightness or sound may be adjusted by sliding up or down on left and right sides, and a media file may be marked or deleted.

In some exemplary embodiments, as shown in FIG. 8, the touch operation may be single-finger left-sliding, and a corresponding control command may be controlling the first display apparatus to display an image setting page. Specifically, the user may slide left with one finger on the second display apparatus, and then the first display apparatus may display different image filters, and presents display statuses, under the different image filters, of a current image obtained by the lens assembly.

Simple functions may be switched on and off by tapping may be set, such as color adjustment, distortion correction, and format change. A form of four squares or a form of one screen with only one function may be used. That is, the screen may be divided into four equivalent sections where each section corresponds to one function thereby including four functions at one time, or the screen may only include one function at one time, and the user may slide left or right and tap to switch and selection the function, or may customize a desired function by using the rear screen.

In some exemplary embodiments, as shown in FIG. 9, the touch operation may be double-finger left-sliding or right-sliding, and a corresponding control command may be switching the photographing mode. Specifically, the action camera may include a mode queue including the following photographing modes in sequence: "photo", "video", and "slow motion video". For example, a current photographing mode may be "video". When the user slides left with two fingers on the second display apparatus, the current photographing mode may be switched from "video" to "photo". When the user slides right with two fingers on the second display apparatus again, the current photographing mode may be switched from "video" to "slow motion video".

In some exemplary embodiments, as shown in FIG. 10, the touch operation may be touch-and-hold, and a corresponding control command may be controlling the lens assembly to perform metering. Specifically, when the first display apparatus displays the image obtained by the lens assembly, the user may perform a touch-and-hold operation on the second display apparatus, and then the lens assembly may be controlled to perform a metering operation.

In some exemplary embodiments, as shown in FIG. 11, the touch operation may be single-finger up-sliding or down-sliding, and a corresponding control command may be dynamically adjusting screen brightness during photographing. Specifically, during photographing, the user may slide up with one finger on the second display apparatus, and then the screen brightness of the first display apparatus may be increased; the user may slide down with one finger on the second display apparatus, and then the screen brightness of the first display apparatus may be reduced.

In some exemplary embodiments, as shown in FIG. 12, the touch operation may be double-finger double-tapping, and a corresponding control command may be switching the content displayed by the first display apparatus and the second display apparatus. Specifically, the user may double tap with two fingers on the second display apparatus, and then the first display apparatus and the second display apparatus may be controlled to exchange the displayed content, in other words, the contents of the front and rear screens are switched.

Some exemplary embodiment of the present disclosure provide an action camera with a selfie function, including: a camera body; a lens assembly disposed on one side of the camera body; a first display apparatus disposed on the same side as the lens assembly of the camera body; and a second display apparatus disposed on the camera body, where the second display apparatus may be configured to obtain a touch command, and may control, according to the touch command, display of the first display apparatus; and the camera control system provided in some exemplary embodiments the present disclosure.

In some exemplary embodiments, the second display apparatus may be disposed on a surface of the camera body of the action camera with a selfie function, the surface may be adjacent to the surface on which the first display apparatus is disposed on.

In some exemplary embodiments, the second display apparatus may be disposed on a surface of the camera body of the action camera with a selfie function, the surface may be opposite to the surface on which the first display apparatus is disposed on.

In some exemplary embodiments, the second display apparatus may be a touch display apparatus.

In some exemplary embodiments, both the second display apparatus and the first display apparatus may be color display apparatuses.

In some exemplary embodiments, both the first display apparatus and the second display apparatus may be touch display apparatuses.

In some exemplary embodiments, the second display apparatus may be connected to the camera body via a flipping structure. One end of the flipping structure may be connected to the camera body, and the flipping structure may rotate relative to the camera body. The second display apparatus may be connected to another end of the flipping structure, and the second display apparatus may rotate relative to the flipping structure. The flipping structure may enable the second display apparatus to change its orientation freely.

In some exemplary embodiments, when the action camera with a selfie function is operating in a selfie mode, the first display apparatus may display an image obtained by the lens assembly.

In some exemplary embodiments, when the action camera with a selfie function is operating in a selfie mode, the first display apparatus may display an image obtained by the lens assembly, and the second display apparatus may stop displaying the image.

In some exemplary embodiments of the present disclosure, a computer-readable storage medium storing a computer program is provided. The computer program may be executed by the processor to implement the selfie control method provided in some exemplary embodiments of the present disclosure. Therefore, the computer program may include all the benefits of the selfie control method provided in some exemplary embodiments the present disclosure. Details are not described herein again.

In the description of the present disclosure, the term "a plurality of" may mean two or more. Unless otherwise specifically defined, orientations or position relationships indicated by terms "up", "down", and the like are orientations or position relationships as shown in the drawings, and these terms are just used to facilitate description of the present invention and simplify the description, but not to indicate or imply that the mentioned apparatus or elements must have a specific orientation and must be established and operated in a specific orientation, and thus, these terms cannot be understood as a limitation to the present disclosure; and terms such as "connected to each other", "mounted", and "secured" should be comprehended in a broad sense. For example, the "connection" may be a fixed connection, a removable connection, or an integral connection; or may be a direct connection or an indirect connection using an intermediate medium. A person of ordinary skill in the art may understand specific meanings of the foregoing terms in the present disclosure based on a specific situation.

In the present disclosure, the description of "one embodiment", "some exemplary embodiments", and "a specific example" means that a specific feature, structure, material or characteristic described in combination with the embodiment(s) or example(s) is included in at least one embodiment or example of the present disclosure. In the present disclosure, the schematic representation of the above terms does not necessarily refer to the same embodiment or example. Moreover, the described specific feature, structure, material, or characteristic may be combined in any suitable manner in any one or more embodiments or examples.

The foregoing is merely illustrative of some exemplary embodiments of the present disclosure and is not intended to limit the present disclosure, and various changes and modifications may be made to the present disclosure by those skilled in the art. Any modifications, equivalent replacements, improvements, etc. made within the spirit and scope of this application should be included within the protection scope of the present disclosure.

What is claimed is:

1. A camera, comprising:
a camera body;
a lens assembly, disposed on a first side of the camera body;
a front screen, being a non-touch screen and disposed on the first side of the camera body to display an image obtained by the camera during a selfie operation; and
a rear screen, being a touch screen and disposed on a second side of the camera body different from the first side, wherein when the lens assembly is facing a user during the selfie operation:
the rear screen is configured to receive a touch operation from the user to generate a first control command to control a camera operation,
the front screen visualizes the touch operation to the user,
wherein when the touch operation includes generating the first control command to adjust a parameter of the selfie operation, the front screen displays an interface to show the adjustment of the parameter to allow the user to adjust the parameter by keeping the lens assembly facing the user.

2. The camera according to claim 1, wherein the front screen is unable to support touch operations thereon; and
the rear screen is a touch screen configured to:
obtain a different touch operation, and
generate a second control command for adjusting a display parameter of front screen or the first control command for operating the lens assembly based on the different touch operation, wherein the first control command and the second control command are generated from different touch operations.

3. The camera according to claim 1, wherein the touch operation includes generating a second control command to play back an image or a video obtained by the camera.

4. The camera according to claim 1, wherein to visualize the touch operation, the front screen is configured to display at least one target parameter, including at least one of: brightness, contrast, or saturation of the front screen.

5. The camera according to claim 1, wherein display area of the rear screen is greater than a display area of the front screen.

6. The camera according to claim 1, wherein both the front screen and the rear screen are configured to display image information obtained by the lens assembly.

7. The camera according to claim 1, wherein the rear screen is configured to:
obtain different types of touch operations corresponding to different control commands, and
control, based on the different types of touch operations, the front screen to display the different control commands accordingly.

8. The camera according to claim 7, wherein
the different types of touch operations are customizable, so that after obtaining the touch operations, the camera generates the corresponding control commands based on the touch operations to control, based on the control commands, the front screen to display correspondingly.

9. The camera according to claim 1, further including:
a control apparatus, wherein the control apparatus is connected to the lens assembly, the front screen, and the rear screen, and is configured to:
when the front screen displays image information obtained by the lens assembly, control, based on the touch operation received by the rear screen, the lens assembly to adjust an image acquisition parameter, and control the front screen to display the adjusted image acquisition parameter.

10. A selfie control method, applied to a camera, wherein the camera comprises:
a camera body;
a lens assembly disposed on a first side of the camera body;
a front screen, being a non-touch screen and disposed on the first side of the camera body to display an image obtained by the camera during a selfie operation; and
a rear screen being a touch screen and disposed on a second side of the camera body different from the first side, wherein when the lens assembly is facing a user during the selfie operation:
the rear screen is configured to receive a touch operation from the user to generate a first control command to control a camera operation,
the front screen visualizes the touch operation to the user,
wherein when the touch operation includes generating the first control command to adjust a parameter of the selfie operation, the front screen displays an interface to show the adjustment of the parameter to allow the user to adjust the parameter by keeping the lens assembly facing the user;
the method comprising:
receiving a touch operation performed by a user on the rear screen;
generating a control command based on the touch operation; and
controlling, based on the control command, at least one target parameter displayed on a target interface on the front screen, so as to adjust a selfie result, wherein the at least one target parameter is associated with at least one of the camera or the front screen.

11. A movable platform, comprising:
a handheld unit; and
a gimbal, disposed on the handheld unit, including a camera, wherein the camera includes:
a camera body;
a lens assembly, disposed on a first side of the camera body;
a front screen, being a non-touch screen and disposed on the first side of the camera body to display an image obtained by the camera during a selfie; and
a rear screen, being a touch screen and disposed on a second side of the camera body different from the first side, wherein when the lens assembly is facing a user during the selfie operation:
the rear screen is configured to receive a touch operation from the user to generate a first control command to control a camera operation,
the front screen visualizes the touch operation to the user, wherein when the touch operation includes generating the first control command to adjust a parameter of the selfie operation, the front screen displays an interface to show the adjustment of the parameter to allow the user to adjust the parameter by keeping the lens assembly facing the user.

12. The movable platform according to claim 11, wherein the rear screen is a touch display screen configured to:
obtain a different touch operation, and
generate a second control command for adjusting a display parameter of the front screen or the first control command for operating the lens assembly based on the different touch operation, wherein the first control command and the second control command are generated from different touch operations.

13. The movable platform according to claim 11, wherein the front screen is further configured to play back an image or a video as controlled by a second control command generated by the rear screen upon receiving a touch operation.

14. The movable platform according to claim 11, wherein the at least one target parameter includes at least one of:
brightness, contrast, or saturation.

15. The movable platform according to claim 11, wherein the rear screen display area is greater than the front screen display area.

16. The movable platform according to claim 11, wherein both the front screen and the rear screen are color display apparatuses.

17. The movable platform according to claim 11, wherein both the front screen and the rear screen are configured to display image information obtained by the lens assembly.

18. The movable platform according to claim 11, wherein the rear screen is configured to:
obtain different types of touch operations, and
generate corresponding control commands based on the different types of touch operations to control, based on the control commands, the front screen to display correspondingly.

19. The movable platform according to claim 18, wherein the different types of touch operations are customizable, so that after obtaining the touch operations, the rear screen generates the corresponding control commands based on the touch operations to control, based on the control commands, the front screen to display correspondingly.

20. The movable platform according to claim 11, wherein the camera further includes:
a control apparatus, wherein the control apparatus is connected to the lens assembly, the front screen, and the rear screen, and is configured to:
when the front screen displays the image information obtained by the lens assembly, control, based on the control command received by the rear screen, the lens assembly to adjust an image acquisition parameter, and control the front screen to display the adjusted image acquisition parameter.

* * * * *